(12) United States Patent
van der Stappen et al.

(10) Patent No.: US 8,534,398 B2
(45) Date of Patent: Sep. 17, 2013

(54) MOTOR VEHICLE WITH ELECTRIC DRIVE

(75) Inventors: Wim van der Stappen, Helmond (NL); Harry Krebbers, Wychen (NL); Olaf van Nuland, Helmond (NL)

(73) Assignee: Benteler Automobiltechnik GmbH, Paderborn (DE)

( * ) Notice: Subject to any disclaimer, the term of this patent is extended or adjusted under 35 U.S.C. 154(b) by 320 days.

(21) Appl. No.: 12/797,665

(22) Filed: Jun. 10, 2010

(65) Prior Publication Data

US 2010/0320012 A1  Dec. 23, 2010

(51) Int. Cl.
*B60L 11/18* (2006.01)
*B60R 16/04* (2006.01)

(52) U.S. Cl.
USPC ........................................ 180/65.1; 180/68.5

(58) Field of Classification Search
USPC ................................ 180/65.1, 68.5
See application file for complete search history.

(56) References Cited

U.S. PATENT DOCUMENTS

| | | | | |
|---|---|---|---|---|
| 3,165,163 A * | 1/1965 | Holka | ........................... | 180/68.5 |
| 3,983,952 A * | 10/1976 | McKee | ........................... | 280/778 |
| 4,216,839 A | 8/1980 | Gould et al. | | |
| 4,365,681 A * | 12/1982 | Singh | ........................... | 180/68.5 |
| 5,015,545 A * | 5/1991 | Brooks | ........................... | 429/99 |
| 5,522,734 A * | 6/1996 | Goertzen | ........................... | 439/500 |
| 5,585,205 A * | 12/1996 | Kohchi | ........................... | 429/99 |
| 5,833,023 A | 11/1998 | Shimizu | | |
| 2001/0013437 A1* | 8/2001 | Husted et al. | ................. | 180/65.1 |
| 2001/0015568 A1 | 8/2001 | Motozawa et al. | | |
| 2007/0221423 A1* | 9/2007 | Chang | ........................... | 180/68.5 |

FOREIGN PATENT DOCUMENTS

| | | |
|---|---|---|
| DE | 4032605 A1 | 3/1992 |
| DE | 60008205 T2 | 7/2004 |
| EP | 0566840 A1 | 2/1993 |
| JP | 05016674 A * | 1/1993 |
| JP | 06166330 A * | 6/1994 |
| JP | 07205733 A | 8/1995 |

OTHER PUBLICATIONS

German Patent Office, Office Action dated Apr. 21, 2010 (3 pages).

* cited by examiner

*Primary Examiner* — J. Allen Shriver, II
*Assistant Examiner* — Bridget Avery
(74) *Attorney, Agent, or Firm* — Rader, Fishman & Grauer, PLLC

(57) ABSTRACT

A motor vehicle has an electric drive and at least one electrical energy storage module connected therewith. A guide extends longitudinally along the motor vehicle, and supports the storage module therein in a longitudinally displaceable manner relative to the motor vehicle.

12 Claims, 3 Drawing Sheets

MOTOR VEHICLE WITH ELECTRIC DRIVE

CLAIM OF PRIORITY

Applicants hereby claim the priority benefits under the provisions of 35 U.S.C. §119, basing said claim of priority on German Patent Application Serial No. 10 2009 025430.7, filed Jun. 16, 2009. In accordance with the provisions of 35 U.S.C. §119 and Rule 55(b), a certified copy of the above-listed German patent application will be filed before grant of a patent.

BACKGROUND OF THE INVENTION

The invention relates to a motor vehicle having an electric drive, and an electric energy storage module therefor.

Motor vehicles that are powered or driven, at least in part, with electrical energy (so-called hybrid drives) are among the prior art. The electrical energy for the electric drive is carried in storage modules that are also called battery packets. The weight of these storage modules is significant, particularly in motor vehicles that are driven exclusively by electricity. It is not uncommon for the storage modules to weigh 300 to 500 kg in order to attain a corresponding driving range. One problem associated with these large battery packets is their integration into existing vehicle concepts, i.e. adapting them to the so-called vehicle packaging. Another problem is the relatively long charging times required for the storage modules. Although the charging times are constantly being optimized and therefore further reduced, at low charge currents, it typically takes several hours to fully charge the storage modules. Alternatively, the empty storage modules can be exchanged for fully charged storage modules. Naturally, exchanging the storage modules must be quick and simple.

SUMMARY OF THE INVENTION

One object of the present invention is to provide a motor vehicle having an electric drive in which exchanging storage modules is simple and quick, and in which the storage modules can also be secured or attached with good crash resistance.

This object is attained in a motor vehicle having the features of patent claim 1.

The subordinate claims relate to advantageous refinements of the inventive thought.

In the present inventive motor vehicle, the storage module or modules are supported and/or arranged in a guide that extends longitudinally along the motor vehicle. The storage modules are longitudinally displaceable relative to the guide. This construction simplifies the loading of the storage modules into the motor vehicle. Naturally, it also simplifies removing the storage modules from the motor vehicle. In addition, an impact damping unit may also be arranged at one or both ends of the guide. The present invention takes into consideration that the storage modules are relatively heavy, and consequently may move within the longitudinally extending guides in the motor vehicle during a crash. The storage modules should be retained in place by impact damping units arranged at each end of the guide in order to prevent the storage modules from being damaged themselves, or even shifting longitudinally out of the guide during an abrupt deceleration. The crash or impact energy imparted to the storage modules is dissipated and converted to a different energy. In particular, the crash energy is absorbed by the impact damping unit through deformation.

Moreover, the arrangement of the guide in the longitudinal direction of the motor vehicle has the advantage that the weight of the storage module is distributed onto both the front axle and the rear axle of the motor vehicle. The guide preferably extends from the front axle to the rear axle of the motor vehicle. The guide can be configured in the form of a channel that connects the front and rear axles of the vehicle to one another. Positioning the storage module, and/or the guide, in the laterally center portion of the motor vehicle is also advantageous.

An impact damping unit is preferably provided, at least in the front area of the motor vehicle. In one advantageous refinement of the invention, the impact damping unit extends to a front bumper portion of the motor vehicle. This makes it possible to distribute the weight of the storage module across nearly the entire length of the motor vehicle. It is also possible to position the impact damping unit directly in the guide. In this case, no additional space outside of the guide is needed for the impact damping unit. The impact damping unit can be supported on a retention plate attached at one end of the guide.

The storage module typically comprises a plurality of individual storage elements. Disposed therein are individual battery or accumulator cells with associated electronic units. For safety reasons, the voltage is limited e.g. to 60 volts direct current for each storage element.

In a practical embodiment of the present invention, the guide preferably has an upwardly opening, C-shaped cross-sectional configuration. Thus, the guide has a base on the bottom, upward-facing legs connected longitudinally to each side of the base, and bars connected to the legs that face one another and define open guide grooves. Such a guide, which can also be called a rail, secures the storage elements or a storage module held therein very securely against laterally acting forces. The C-shaped configuration also protects the individual storage elements against vertical displacement. The individual storage elements are, at least in part, laterally enclosed, and therefore positively connected with the guide. The only freedom of movement of the storage module is longitudinal displacement along the guide. The storage module preferably includes seating units that are arranged in a longitudinally displaceable fashion in the guide. The storage elements fit into the seating units. In other words, the storage elements are not held directly by the guide, but rather are mechanically connected to seating units which are in turn supported in the C-shaped guide.

The seating units orient the storage elements in the same manner and orientation as the guide groove retains the seating units. More specifically, the seating units grip lateral retention bars on the storage elements. What is important is that all of the storage elements can be displaced only in the longitudinal direction of the guide. The seating units and the storage elements thus have a positive interconnection using fitting elements that are configured to fit with one another, such as using a groove and spring arrangement.

The seating unit may theoretically be longer than the storage elements when the same are arranged in a row. The number of storage elements may be coordinated with the associated vehicle type.

The present invention makes it possible to attach or mount a standardized storage module in a vehicle very rigidly. The storage elements are combined to create an elongate storage module that can be placed in a centrally disposed channel in the motor vehicle in a manner that conserves a good deal of space. The channel may extend between and interconnect the front axle to the rear axle of the vehicle. This connection has a positive effect on strength, and thus the behavior of the chassis. Because of the freedom in the selection of the material for the guide, it is possible to produce the guide from lightweight metals, especially aluminum, plastic, or composite materials, regardless of the materials used in other components of the motor vehicle. This design minimizes weight, while retaining substantial strength. Naturally, the freedom in the selection of the material can also reduce costs. The assembly and exchange of the storage module and storage elements is simple and inexpensive, while simultaneously providing excellent results in side crashes. The "resilient" or non-static support of the storage module is achieved by integrating in the support a crush box or impact damping unit. In a crash, the crush box makes it possible to absorb the associated kinematic energy, so as to avoid the need for the other party involved in the crash to absorb this impact energy.

These and other advantages of the invention will be further understood and appreciated by those skilled in the art by reference to the following written specification, claims, and appended drawings.

BRIEF DESCRIPTION OF THE DRAWINGS

The invention shall be explained in greater detail in the following using the exemplary embodiment depicted schematically in the drawings.

DETAILED DESCRIPTION OF THE PREFERRED EMBODIMENTS

Figure 1:
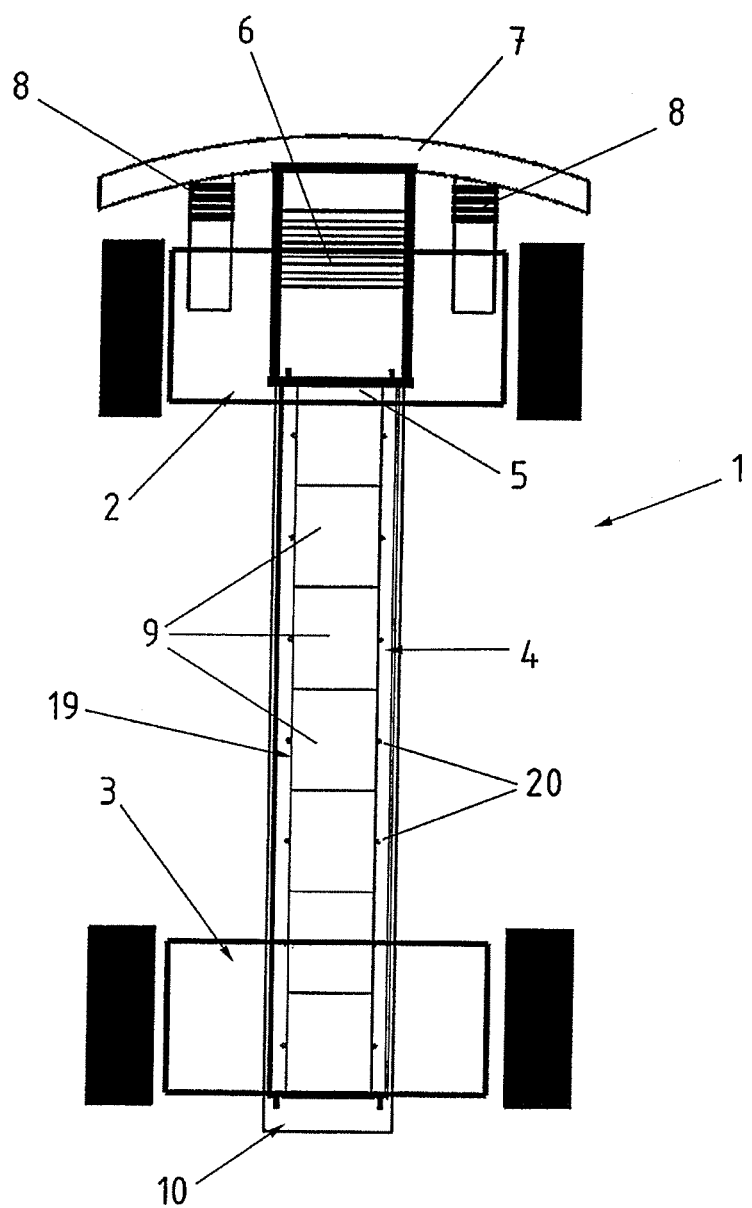
FIG. 1 depicts the chassis of a motor vehicle having a guide that extends in the longitudinal direction of the motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 is a highly simplified schematic depiction of the chassis portion of a motor vehicle 1. It can be seen that a guide 4 is disposed in the center of the motor vehicle 1, and extends longitudinally along the motor vehicle 1 between a front axle 2 and a rear axle 3. The guide 4 is depicted in detail in FIGS. 2 and 3. The illustrated guide 4 connects the schematically depicted front axle 2 with the rear axle 3. An impact damping unit 6, also known as a crush box, is disposed on the front end 5 of the guide 4. This impact damping unit 6 extends to a front bumper 7 that is also connected via crush boxes 8 to the body of the motor vehicle 1.

Figure 2:
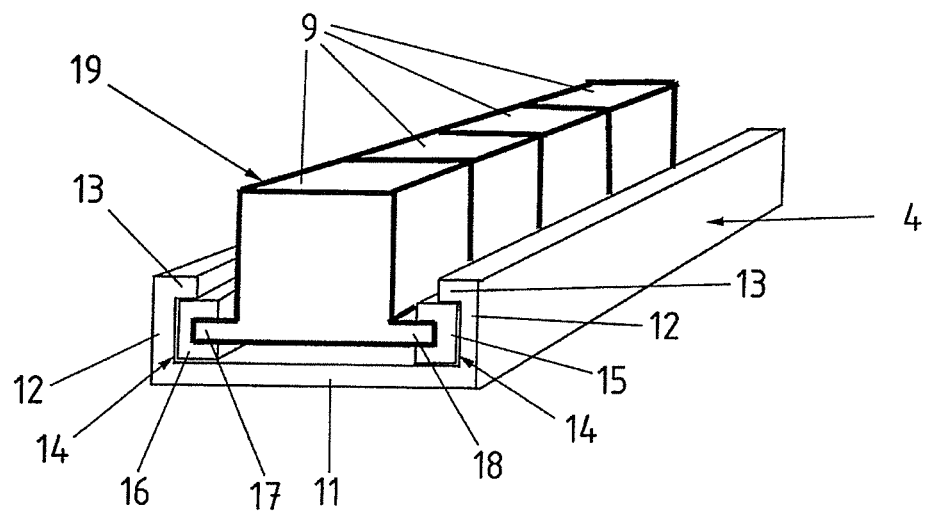
FIG. 2 is a perspective elevation of the guide in FIG. 1.
Figure 3:
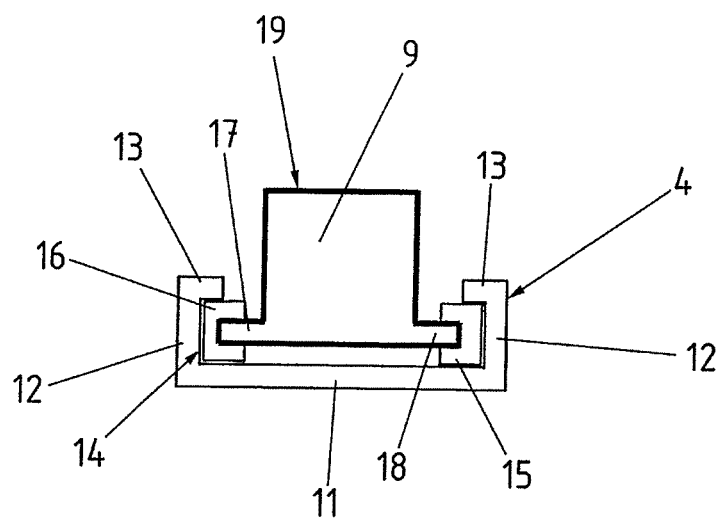
FIG. 3 depicts a section through the guide depicted in FIG. 2.

The guide 4 receives and supports individual storage elements 9. In this exemplary embodiment, the storage elements 9 are configured as rectangular units, and are placed into the guide 4 from the rear of the motor vehicle 1. All together, the storage elements 9 and lateral seating units 15, 16 form a storage module 19 (FIGS. 2 and 3). The guide 4 is a component of a channel 10, wherein the guide 4 defines the lower portion of the channel 10, as can be seen in FIG. 2. The guide 4 is configured open on top and with a C-shaped cross-section. The guide 4 includes a base 11 that defines or forms the bottom of the channel 10. Legs 12, that extend upwardly in the plane of FIG. 3, are attached longitudinally to each side of the base 11. Bars 13 are located on the upper portions of the legs 12 and face one another, so as to form or define mutually opposing undercut guide grooves 14 along the longitudinal portions of the base 11. A longitudinally displaceable seating unit 15, 16 for the storage module 19 is disposed in each of the guide grooves 14. These seating units 15, 16 are retained in and held by the guide grooves 14, and have a generally U-shaped cross-sectional shape. Seating units 15, 16 grip longitudinally protruding retention bars 17, 18 on the storage elements 9. Retaining elements 20, in the form of bolts or the like, mechanically join the individual storage elements 9 to the seating units 15, 16. In this exemplary embodiment, one retaining element 20 is provided on each side of each storage element 9, with the retaining elements 20 being arranged opposite one another.

The guide 4, and/or the seating units 15, 16, may have an extruded construction. The longitudinal extension of the seating units 15, 16 in the guide 4 is longer than a single storage element 9. The seating units 15, 16 act to some extent as an adapter between the storage elements 9 and the guide 4. Consequently, it is possible to use the same guide 4 for storage elements 9 that have differently shaped retention bars or other connectors, simply by using alternatively configured seating units 15, 16 in the inventive motor vehicle.

Figure 4:
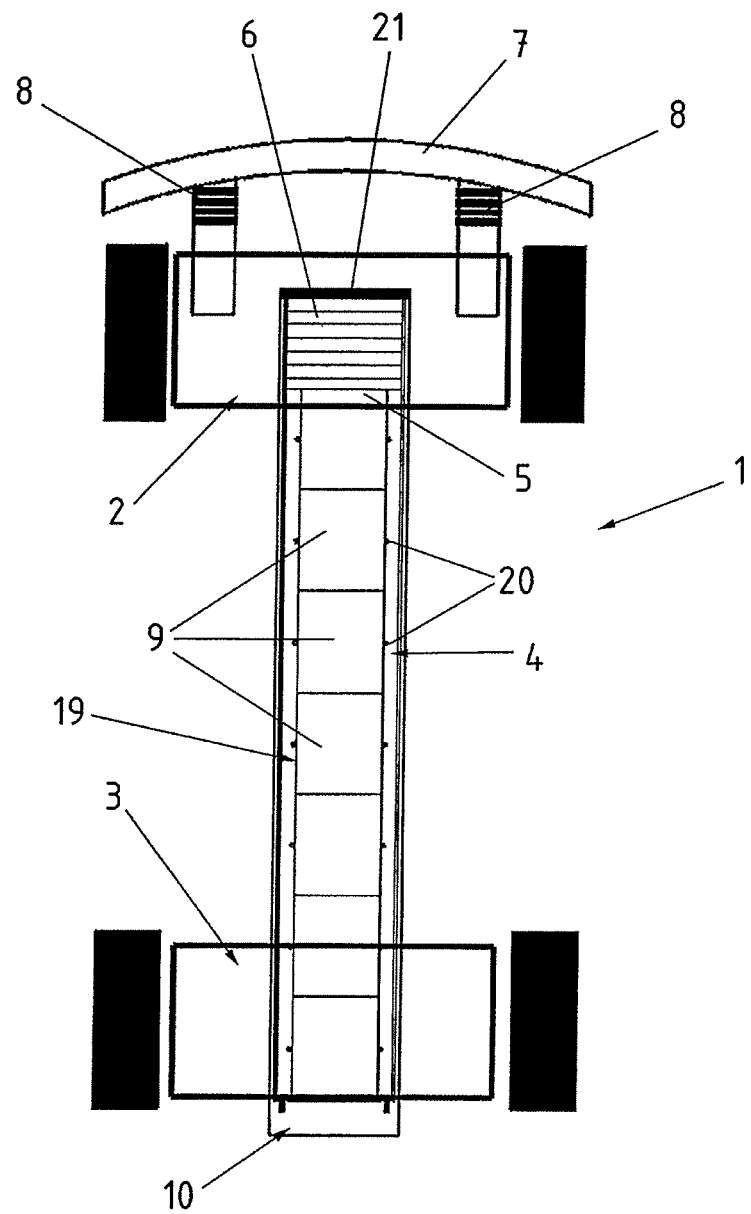
FIG. 4 depicts an alternative to the motor vehicle in FIG. 1.

FIG. 4 depicts a modification to the embodiment in FIG. 1. The impact damping unit 6 is arranged immediately at the end 5 of the guide 4, and more specifically, within the guide 4. Thus, it is shorter than the construction shown in FIG. 1, and does not extend to the bumper 7. A support plate 21 at the end of the guide 4 acts as a counterbearing that supports the impact damping unit 6.

In the foregoing description, it will be readily appreciated by those skilled in the art that modifications may be made to the invention without departing from the concepts disclosed herein. Such modifications are to be considered as included in the following claims, unless these claims by their language expressly state otherwise.

Legend:
    1—Motor vehicle
    2—Front axle
    3—Rear axle
    4—Guide
    5—End
    6—Impact damping unit
    7—Bumper
    8—Crush box
    9—Storage element
    10—Channel
    11—Base
    12—Leg
    13—Bar
    14—Guide groove
    15—Seating unit
    16—Seating unit
    17—Retention bar
    18—Retention bar
    19—Storage module
    20—Retention element
    21—Support plate

The invention claimed is:

1. A motor vehicle, comprising:
an electric drive;
at least one storage module for electrical energy electrically connected with said electric drive;
a guide extending longitudinally along said motor vehicle, and supporting said storage module therein in a longitudinally displaceable manner relative to said motor vehicle;
first and second longitudinally displaceable seating members disposed in said guide and supporting therein said at least one storage module;
a front axle; and
a rear axle;
wherein the guide extends longitudinally along the motor vehicle between the front axle and the rear axle, and the at least one storage module is placed into the guide from a rear portion of the motor vehicle;
wherein said storage module includes lateral retention bars, and said first and second seating members grip said lateral retention bars on said storage module.

2. A motor vehicle as set forth in claim 1, including:
an impact damping member disposed at one end of said guide.

3. A motor vehicle as set forth in claim 1, wherein:
said guide is disposed adjacent to a laterally central portion of said motor vehicle.

4. A motor vehicle as set forth in claim 1, wherein said guide extends from said front axle to said rear axle of said motor vehicle.

5. A motor vehicle as set forth in claim 1, including:
a channel having a portion thereof defining said guide.

6. A motor vehicle as set forth in claim 2, including:
a bumper; and wherein
said impact damping member extends to said bumper and is operably connected therewith.

7. A motor vehicle as set forth in claim 2, wherein:
said impact damping member is disposed within a portion of said guide.

8. A motor vehicle as set forth in claim 2, wherein the impact damping member is a crush box adapted to absorb crash energy, and said crush box is disposed on a front end of said guide and extends to a front bumper.

9. A motor vehicle as set forth in claim 2, wherein said impact damping member is a crush box adapted to absorb crash energy, and said crush box is disposed within said guide and does not extend to a front bumper.

10. A motor vehicle as set forth in claim 5, wherein:
said channel interconnects said front axle and said rear axle.

11. A motor vehicle, comprising:
an electric drive;
at least one storage module for electrical energy electrically connected with said electric drive;
a guide extending longitudinally along said motor vehicle, and supporting said at least one storage module therein in a longitudinally displaceable manner relative to said motor vehicle;
first and second longitudinally displaceable seating members disposed in said guide and supporting therein said at least one storage module;
a front axle; and
a rear axle;
wherein the guide extends longitudinally along the motor vehicle between the front axle and the rear axle, and the at least one storage module is placed into the guide from a rear portion of the motor vehicle;
wherein said guide has an upwardly opening C-shaped cross-sectional configuration, with a base, upward-facing legs connected longitudinally to opposite sides of said base, and bars connected with said legs and facing one another to define therebetween a guide groove.

12. A motor vehicle, comprising:
an electric drive;
at least one storage module for electrical energy electrically connected with said electric drive;
a guide extending longitudinally along said motor vehicle, and supporting said at least one storage module therein in a longitudinally displaceable manner relative to said motor vehicle;
first and second longitudinally displaceable seating members disposed in said guide and supporting therein said at least one storage module;
a front axle; and
a rear axle;
wherein the guide extends longitudinally along the motor vehicle between the front axle and the rear axle, and the at least one storage module is placed into the guide from a rear portion of the motor vehicle;
wherein said guide includes guide grooves, and said first and second seating members are grippingly retained in said guide grooves.

* * * * *